June 23, 1942.　　　A. J. KOON　　　2,287,435
VALVE
Filed Aug. 16, 1940　　　2 Sheets-Sheet 1
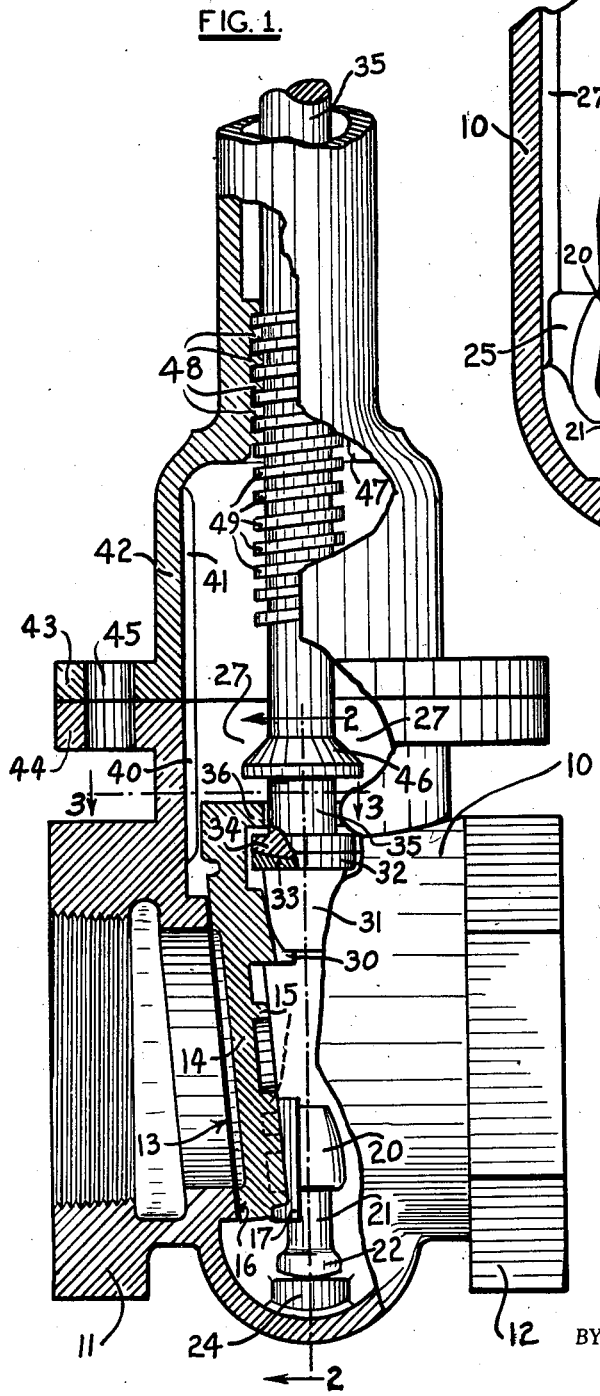
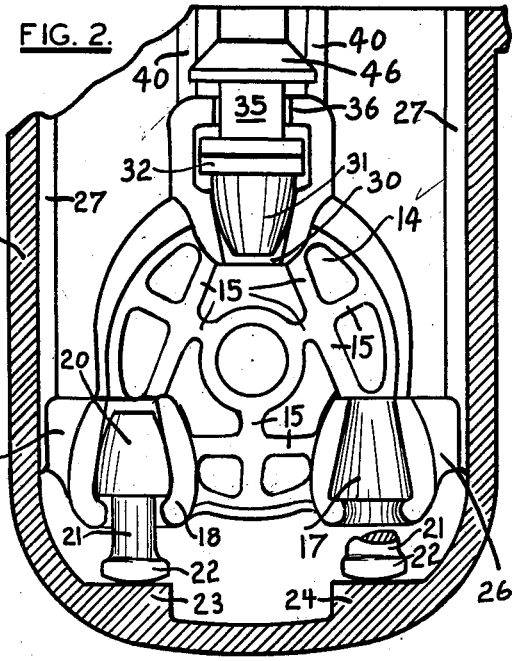
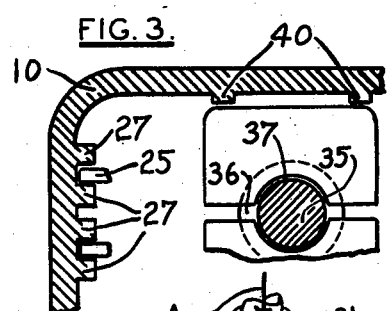
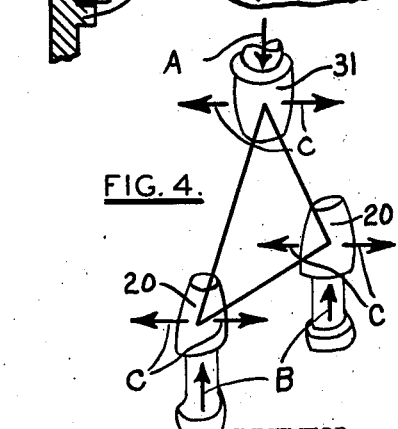
INVENTOR.
ARTHUR J. KOON.
BY Thomas G. Boman
ATTORNEY June 23, 1942.　　　A. J. KOON　　　2,287,435
VALVE
Filed Aug. 16, 1940　　　2 Sheets-Sheet 2

INVENTOR.
ARTHUR J. KOON.
BY Thomas G. Boman.
ATTORNEY

Patented June 23, 1942

2,287,435

UNITED STATES PATENT OFFICE

2,287,435
VALVE

Arthur J. Koon, Grand Rapids, Mich., assignor to Jacob R. Wiggers, Grand Rapids, Mich.

Application August 16, 1940, Serial No. 352,835

8 Claims. (Cl. 251—68)

My invention has reference to valves and consists of certain improvements which are fully set out in the following specification and shown in the accompanying drawings which form a part thereof.

My invention may be applied to gate valves provided with a pair of seats and a pair of disks and one of the primary objects is to form these members so as to make a tight valve by bringing the faces of the disks and disk seats into perfect position and alinement, the arrangement being such as to close the valve by bringing the faces of the disks against the disk seats with a uniform seating pressure.

Another very material feature of my invention lies in the construction whereby the several points of pressure application to the disks are located exactly opposite the valve or disk seats themselves with equal spacing of contact points. This longitudinal alinement prevents the disks from being subjected to bending strains, thus permitting a lighter construction, and also gives a better contact as to the point of pressure application is within the subtended area of the seat itself.

Another feature of my invention is the construction whereby the seats and disks approach each other longitudinally, at the terminal point of the seating, this preventing scratching or mutilation of either the disk or its seat with the attendant danger of leakage and then replacement. And, similarly, withdrawal does not in any way harm the finished seating surfaces due to the seating pressure being released before the disks move away from the valve seats.

Yet another feature lies in my novelly shaped wedges of spheroid segmental shape and also in the means for applying pressure thereto whereby the disks can move relatively to each other and thus seat securely.

Another feature resides in my integrally formed yoke, the bonnet and yoke being in one piece, this being a sturdier construction and permitted by my novel screw construction at the top thereof.

My invention also comprehends the various features of construction and details which are all fully described hereinafter and more particularly defined in the claims.

My invention will be better understood by specific reference to the drawings, in which, Fig. 1 is a side view of a steam valve equipped with my invention, parts being broken away in order to expedite the showing.

Fig. 2 is a sectional view taken along the plane of the line 2—2 of Fig. 1.

Fig. 3 is a fragmentary sectional view taken along the plane of the line 3—3 of Fig. 1.

Fig. 4 is a schematic view illustrating the directions of the several forces upon the wedges.

Like numerals refer to like parts throughout the several views.

Figure 5:
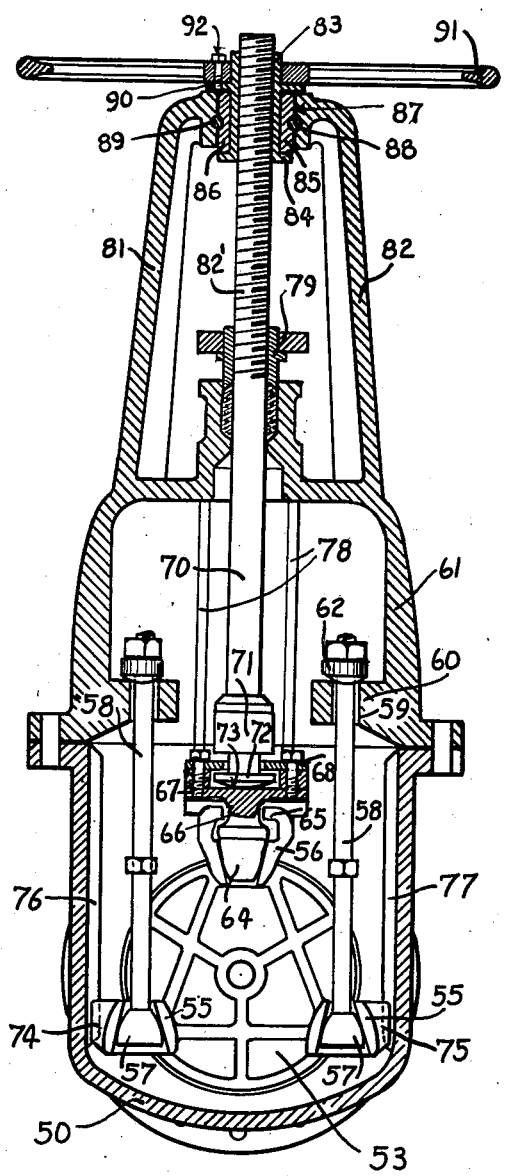
Fig. 5 is a cross sectional view of my invention as applied to a water valve construction.

Referring to Figs. 1, 2 and 3, numeral 10 indicates a body, as from a casting, with ends 11 and 12, threaded as shown to receive the pipes carrying the ingoing and outgoing streams of gas or liquid. In this particular modification the construction is designed for steam although, of course, it is not limited thereto.

The ends are extended inwardly as shown to provide seats and, since the construction is symmetrical about the center line, only seat and disk are shown. The end 11 has the seat 13 located inwardly therefrom, this seat slanting upwardly as shown.

A disk 14, see also Fig. 2, having reinforcing ribs 15, has a rim or seating surface 16, see Fig. 1, this surface 16 abutting the seat 13.

At the bottom part of the disk 14 recesses or half-sockets 17 are formed. These are integrally cast with the disk, if desired, and, as shown at the right hand side of Fig. 2, are of conical shape. The opposite disk has similar half-sockets and it is to be understood that these recesses face each other so that a socket is formed for the wedges 20. Each of the lower wedges is of spheroidal segmental shape with a stem 21 and a terminal 22. The terminal is spherically rounded as shown whereby the wedge can rock in any direction and thus the disks can aline themselves to seat snugly and tightly without the distortion or binding of any of the parts.

The body casting 10 may have abutments 23 and 24 for receiving the rounded terminals 22 thereagainst.

It is to be understood that the spheroidal segmental wedges 20 are received within the conical walls of the respective sockets and that consequently they can only move therein to a definite limit. In other words, the wedges would slide into the sockets, if free to do so, until wedged therein. However, my construction contemplates that the wedges will never travel to this point. Prior to this the wedges are stopped in their movement by lateral resistance of the half-sockets to move apart. That is, as will be clearly understood as the description proceeds, the wedges cause lateral pressure which shifts the valve disks squarely against and onto their seats.

The disk 14 has ears 25 and 26 alongside the bottom thereof, see Fig. 2, and these ears are slidably located between a series of ribs 27 on the inner side of the body wall.

Near the upper portion of the disk 14, a recess 30 of semi-conical shape is formed and cooperates with a similarly formed recess on the opposite disk to form a seat or socket for the wedge 31, this wedge being shaped similarly to the wedges 20. The upper part of this wedge is enlarged at 32 and spherically dished at 33 to receive the convexed lower end 34 of the stem 35. Thus the upper wedge 31 permits adjusting movement of the disks whereby the disks may squarely and firmly seat in their sealed position.

The disks are extended upwardly and around the stem 35, see Figs. 1, 2 and 3, and have the flange 36 which overlaps the ridge on the lower end of the stem 35 whereby raising of the stem raises the disks. Clearance at 37 permits inward lateral movement of the disks prior to their upward movement.

Ribs 40, see Figs. 1, 2 and 3, are formed on the inner side of the body casting 10, and prevent the disks from spreading by contacting the upper portions thereof. Alined ribs 41 are formed on the inner wall of the bonnet 42, this bonnet having a flange 43 which may be attached to the flange 44 of the body 10 by means of bolts, not shown, through the bolt holes 45.

The stem 35 has the enlargement 46, tapered as shown, for entry into the conical recess 47 during the repacking operation. The recess 47 is located in the bonnet 42, this bonnet 42 also carrying threads 48 to receive the threads 49 on the stem or shaft 35 whereby the disks may be raised and lowered as desired.

As will now be understood, rotation of the shaft or stem 35 in one direction permits the two disks to drop downwardly until they arrive at their approximate seating position. If necessary, force is provided for this downward movement by friction between wedge 31 and its seat. At substantially the completion of the downward movement, the wedges 20 have their terminals 22 contact the abutments 23 and 24 and this immediately causes the lower edges of the disks to spread apart and come into contact with their respective seats. Also, the upper wedge 31 rides down slightly into its socket and causes the upper parts of the disks to shift laterally apart onto their seats. This is diagrammatically illustrated in Fig. 4, arrow A illustrating the downward force, arrows B the upward forces, and arrows C the laterally directed forces.

Figure 6:
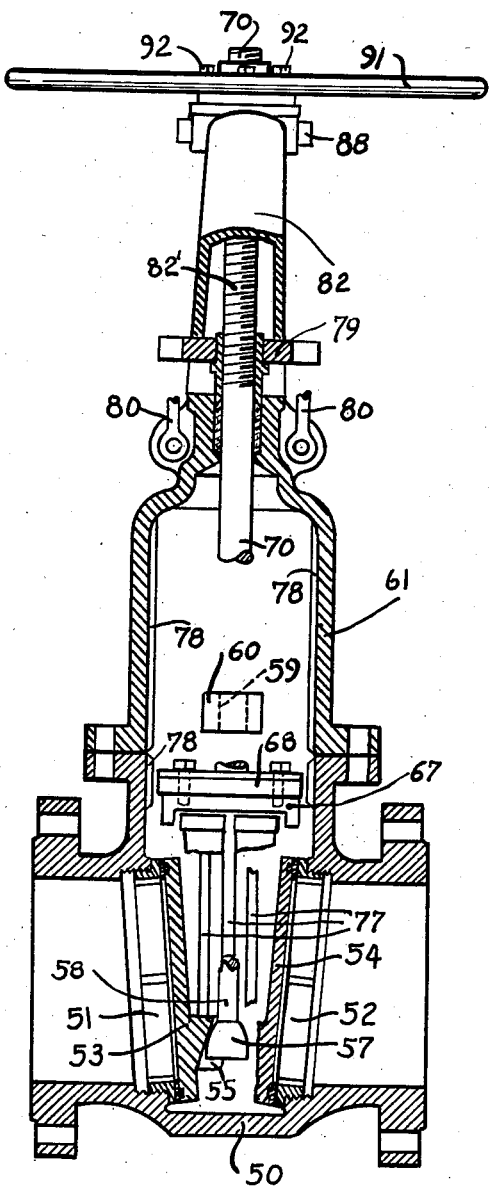
Fig. 6 is a view at right angles to Fig. 5.
Figure 7:
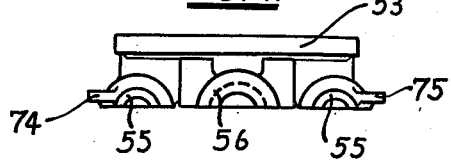
Fig. 7 is a top view of the disk utilized in the construction shown in Figs. 5 and 6.

Referring now to Figs. 5, 6 and 7, numeral 50 indicates the body with seats 51 and 52 screwed thereinto as shown, disks 53 and 54 being provided as shown.

Disks 53 and 54 are of similar construction so only one of these will be described in detail. As shown in Fig. 7, two lower half-sockets 55 are provided, one upper half-socket 56, and wedges 57, of spherical segmental shape, are rigid with rods 58.

The rods 58 extend upwardly as shown through holes 59 in extensions 60 on the inner walls of the bonnet 61. The holes 59 are recessed to concave shape at their upper ends and nuts 62 with lower concave surfaces fit therein whereby swinging and alinement of the wedges 57 is permitted thus giving or permitting square and secure seating of the disks.

The pair of upper half-sockets receive the spheroidal segmental wedge 64. The upper part of the socket members form a lip 65 which fits around the reduced portion 66 of the wedge. The wedge is then extended outwardly to plate form at 67 and a flange box and plate 68 is bolted thereto.

The shaft 70 is enlarged at 71 immediately above the flange box and at 72 inside of the flange box and the flange 72 is convexed at 73 whereby the upper wedge 64 can move relatively to its disks and thus permit exact and proper seating of the disks.

The disk 53 has ears 74 and 75 which ears are slidably received between the ribs 76 and 77 and thus the lower edges of the disks are maintained in proper sliding position. Abutment ribs 78 serve to prevent the upper edges of the disks from undue separation. The ribs 78 are located both on the body member 50 and bonnet 61.

The bonnet 61 has a stuffing box 79 with pivoted bolts 80 holding the packing gland therein and spaced arms 81 and 82 are integrally united with the bonnet 61 and thus a sturdy construction is had. This construction is possible due to the fact that I utilize a replaceable valve stem nut.

The shaft or stem 70 is threaded at its upper end as at 82' and a valve stem nut 83 with an outwardly extending flange 84 at its lower end is threaded onto the portion 82. A split bushing comprising parts 85 and 86 which fit together to form a cylindrical bushing with an exterior diameter almost equal to the exterior diameter of the flange 84, is inserted into opening 87 in the joining portion of the arms 81 and 82. Two holes are bored through the arms 81 and 82 so as to be in tangency with the large opening 87 and consequently portions of these holes pass through each of the portions of the split bearings. Bolts 88 and 89 extend through these holes in the arms and thus the several parts are locked in position.

However, it will be understood that removal of these bolts permits the disassembly of the bearing whereby a new valve stem nut may be inserted if and when desired.

Thus the body of the valve and the bonnet are bolted together but the bonnet has the yoke integrally cast therewith whereby manufacture is facilitated and the construction improved.

The valve stem nut 83 has a second flange 90 near its top part, as shown, and a hand wheel 91 is attached thereto by screws 92. Thus rotation of the handwheel operates the valve disks.

From the foregoing it is believed that the novelties, peculiarities and advantages, as well as the functions of the several mechanisms and their operation as a whole will be clearly appreciated and understood and it will also be apparent that many modifications and embodiments of the invention may be made which will differ radically from the illustrated structure without departing from the spirit of the invention or the scope of the appended claims.

I claim:

1. A valve comprising a casing having a seat, a disk movable to a position in front of and a second position away from said seat, and means for urging the disk laterally against the seat, said means comprising a plurality of spheroid segmental wedges located at or near the periphery of the disc, the disk being formed with conical seats for slidably receiving the wedges, said wedges being free to rotate about their longitudinal axes for the purpose described.

2. In a valve construction having a pair of seats facing one another and diverging upwardly and outwardly, the combination of a pair of disks mounted for translation to and from seating position, each of said disks having three operating surfaces thereon, wedges contacting said surfaces, said wedges having semi-spherical ends and means for moving said wedges, said means contacting the said semi-spherical ends whereby a universal connection is had therebetween, whereby both rolling and translating movement are had.

3. In a valve construction, a casing having two inwardly facing and spaced apart seats, a bonnet fastened to the casing and forming a chamber over the seats, two disks, one for each seat, guiding means for the disks whereby they may be slid to and from closing position, means for moving the disks simultaneously, facing surfaces on the disks near their top portions forming a recess, a wedging member therein, additional facing surfaces on the disks near their bottom portions forming a recess, a second wedging member therein, means between the second mentioned or moving means and the first wedging member for operating the said wedging member, an extension from the bonnet extending into the chamber and elongated means rigid with the second wedging member and extending upwardly and cooperating with the bonnet extension whereby downward movement of the second wedging member is limited for the purpose described.

4. A combination of elements as set forth in claim 3 in which the elongated member is swingably connected onto the said bonnet extension for the purpose described.

5. A combination of elements as set forth in claim 3 in which a third wedging member and set of facing surfaces are provided, the three sets of facing surfaces being positioned upon the rim of the disks.

6. A combination of elements as set forth in claim 3 in which a third wedging member and set of facing surfaces are provided, the three sets of facing surfaces being positioned at the apexes of an equilateral triangle.

7. In a valve construction having a pair of outwardly extending seats facing each other, the combination of a pair of disks mounted for movement to and from seating position, means, including three wedges of conical shape seated between the disks, for shifting the disks apart, said wedges including an upper wedge with its larger end positioned uppermost, said larger end being concaved, operating means having a lower convexed end seated in the said concaved portion, and means for preventing excessive separation of the pair of disks.

8. In a valve of the character described, the combination of, a casing having a pair of upwardly and outwardly extending seats, said seats facing each other, a pair of disks mounted for movement from positions immediately in front of the seats and juxtaposed thereto to other positions away from the said seats, means for moving the seats to tightly closed positions and for equalizing the pressure therebetween comprising three wedges, each of said wedges having a wedging portion of gradually decreasing cross sectional area extending toward the central portion of the disks, said wedging portion engaging both of the said disks, and additional means attached to and cooperatively associated with at least one of the disks for contacting each of the wedges to prevent its bodily displacement but yet permitting the wedge to have both radial wedging action and circumferential action for the purpose described.

ARTHUR J. KOON.